(No Model.)
FREDERICK BRANDENBERGER, Dec'd.
FREDERIKA BRANDENBERGER, Executrix.
PAINT MIXER.
No. 330,555. Patented Nov. 17, 1885.
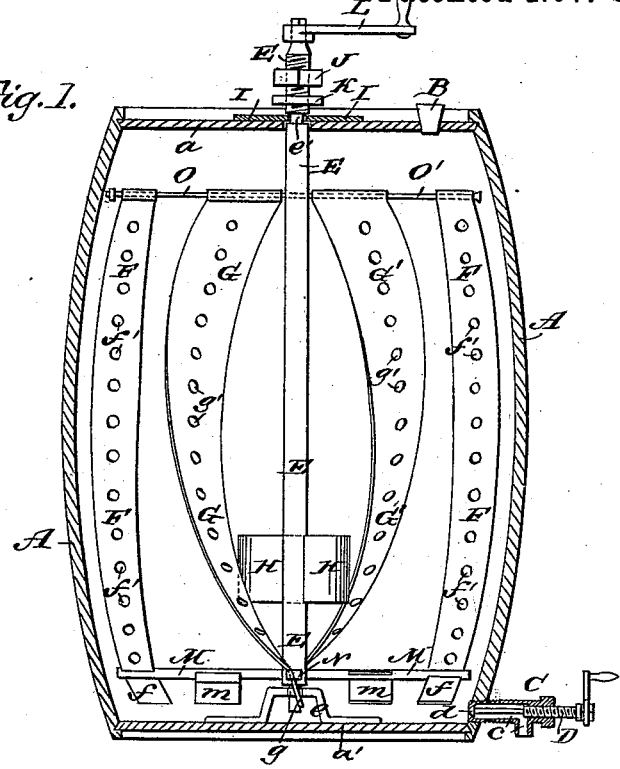
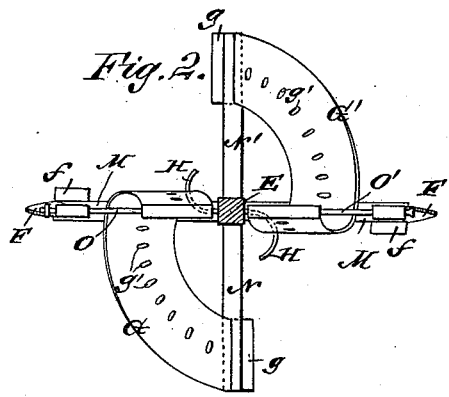
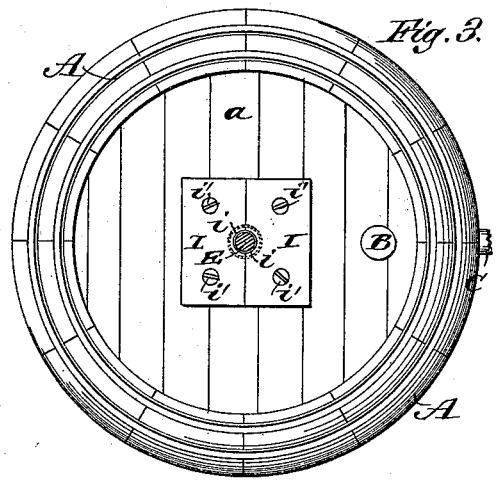
WITNESSES:
Otto Berger
C. Sedgwick
INVENTOR:
F. Brandenberger
BY Munn & Co
ATTORNEYS.

UNITED STATES PATENT OFFICE.

FREDERICK BRANDENBERGER, OF DANVILLE, ILLINOIS; FREDERICKA BRANDENBERGER EXECUTRIX OF SAID FREDERICK BRANDENBERGER, DECEASED.

PAINT-MIXER.

SPECIFICATION forming part of Letters Patent No. 330,555, dated November 17, 1885.

Application filed April 4, 1885. Serial No. 161,200. (No model.)

*To all whom it may concern:*

Be it known that I, FREDERICK BRANDENBERGER, of Danville, in the county of Vermillion and State of Illinois, have invented a new and Improved Paint-Mixer, of which the following is a full, clear, and exact description.

My invention relates to machines designed more especially for stirring mixed paint in a storage-vessel prior to drawing the paint from said vessel as required for use.

The invention consists in various constructions and combinations of parts of the mixing-machine, all as hereinafter fully described and claimed.

Reference is to be had to the accompanying drawings, forming part of this specification, in which similar letters of reference indicate corresponding parts in all the figures.

Figure 1 is a vertical sectional elevation of my improved paint-mixer. Fig. 2 is a plan view of the mixing-blades with their connections to the shaft, which is in horizontal section; and Fig. 3 is a plan view of the mixer vessel or tank with the shaft in section just above the head of the vessel.

The letter A indicates a suitable vessel, such as a keg or tank of any desired size—say, from three to thirty or more gallons capacity—and having closed ends, forming a tight receptacle, into which mixed paint may be filled through a hole closed by a bung, B. In the side of the vessel A, next its bottom, is fitted the faucet C, having a screw-plug valve, D, the head $d$ of which closes to a seat formed at the inner end of the discharge-passage $c$ of the faucet, so as to exclude the paint from the passage when the valve is closed, and thus prevent clogging of the faucet by the paint.

The letter E indicates the shaft to which the mixing-blades F F G G' H are attached, as presently described, said shaft being journaled in any suitable step block or bearing, $e$, fixed to the bottom of vessel A at its center, and having a circumferential groove at $e'$ in line with the head $a$ of the vessel A, so that a pair of plates, I I, having opposite notches, $i\ i$, may be slipped by their notches into the groove $e'$, and then be fastened to the head of the vessel by screws $i'$, or otherwise, to form a durable bearing for the shaft at the top of the vessel A, and prevent endwise movement of the shaft. Above the groove $e'$ of shaft F the shaft is screw-threaded to receive a nut, J, and between the nut J and plates I I is placed on or around the shaft the rubber or other suitable washer, K, which may be clamped tightly to the plates I I by the nut J when the mixing-shaft is not operated. A hand-crank, L, fixed or applied to the end of the shaft, is turned when the mixing-blades are to be worked for mixing the paint in the vessel, and at such time the nut J will be run up on the shaft, so that the washer K may be lifted to avoid wear of it on the plates I I, as the shaft and mixing-blades are rotated. It is evident that the washer K, when clamped to plates I I, forms a packing, which effectually prevents the entrance of air to the vessel A through its head around the shaft F; hence the vessel will be practically air-tight, and greasy skin or scum will not so quickly form on the paint in the vessel, thus avoiding waste of paint and keeping the paint in a fresher and better condition.

Instead of the washer K and nut J, a stuffing-box may be used; but the nut and washer are at present preferred.

To the lower end of the mixer-shaft E are fixed the two opposite and aligned pairs of arms M M N N', and to the shaft, near the top of vessel A, are fixed the pair of arms O O', which may consist of a single rod passed through the shaft, as shown, and to these arms M M N N' O O' the mixing-blades are attached, as next described. The mixing-blades F F are about flat, and are shaped at the outer edge to conform to the side walls of the vessel, and are fixed to the opposite arms O O' at their upper ends, and to the opposite arms M M at their lower ends, which pass through said arms to form extension-plates $f$, reaching nearly or quite to the bottom $a'$ of the vessel A, so that while the blades F rotate their outer edges will work as closely as may be to the sides of the vessel A, and their lower ends, $f$, will work along the bottom of the vessel.

The mixing-blades G G' consist of suitable plates twisted into spiral form, the blade G being connected at its upper end to the inner part of arm O, next the shaft E, and at its lower end to the outer end of arm N, and the blade G' is connected at its upper end to the inner part of arm O', next the shaft E, and at its lower end to the outer end of arm N'. I extend the blades G G' below the arms N N', to form auxiliary scraper-blades $g$ $g'$, respectively, which, like the ones $f$, work along the bottom of the vessel, and similar auxiliary and reversely-inclined blades $m$ $m$ are or may be fixed to arms M M between the shaft E and blades $f$, and for a like purpose. In the larger sizes of the mixer I prefer to fix to shaft E the blades H H, which may consist of a single plate passed through the shaft and bent into S form, as indicated clearly in Fig. 2. I prefer to perforate the blades F G G', as at $f'$ $g'$, to secure a more thorough agitation and mixing of the paint in the vessel.

The operation of the mixer is as follows: As the shaft E is turned by the crank L the blades G G' will lift the liquid paint from the bottom of the vessel A, and cause the paint to rise in whirling currents toward the center and top of the vessel, and the paint will flow back and downward around the blades F, which thoroughly agitate the paint next the sides of the vessel, while the auxiliary blades $f$ $g$ $m$ stir up the paint from the bottom of the vessel, the blades H, when used, assisting in the work, so that at any time required the paint may be very quickly and thoroughly mixed to a uniform consistence when any desired quantity of it is to be drawn from the faucet C.

The crank L and faucet C may be removed when transporting the complete mixer, or all parts of the mixer, except the vessel A, may be shipped, so as to be applied to a paint-holding vessel to make a complete machine where it is to be used.

Having thus described my invention, what I claim as new, and desire to secure by Letters Patent, is—

1. A paint-mixer comprising a vessel, A, a shaft, E, provided with arms M M N N' O O', blades F F, fixed to arms O O' M M so as to rotate next the sides of the vessel, and the inner spirally-arranged blades, G G', fixed, respectively, to arms O N and O' N', substantially as herein set forth.

2. A paint-mixer comprising a vessel, A, a shaft, E, provided with arms M M N N' O O', outer blades, F F, inner spirally-arranged blades, G G', and the auxiliary lower blades, $f$ $g$ $m$, substantially as herein set forth.

3. A paint-mixer comprising a vessel, A, a shaft, E, provided with arms M M N N' O O', outer blades, F F, inner spirally-arranged blades, G G', lower blades, $f$ $g$ $m$, and blades H, substantially as herein set forth.

4. A mixing or stirring device for mixing-machines, comprising a shaft, E, having arms M M N N' O O', outer blades, F F, and inner spirally-arranged blades, G G', fixed to said arms, substantially as herein set forth.

5. A mixing or stirring device for mixing-machines, comprising a shaft, E, having arms M M N N' O O', outer blades, F F, and inner spirally-arranged blades, G G', fixed to said arms, and lower blades, $f$ $g$ $m$, and either with or without blades H, substantially as herein set forth.

6. The combination, with the vessel A and shaft E, of the nut J and washer K, substantially as herein set forth.

FREDERICK BRANDENBERGER.

Witnesses:
M. E. HAINES,
FRANK I. LINDLEY.